United States Patent
Linthout

[15] 3,680,897
[45] Aug. 1, 1972

[54] FORCE-FITTED PIN- AND TUBE JOINT AND A FRAME FOR AN APPARATUS PROVIDED WITH SUCH A JOINT

[72] Inventor: Theodoor Hillebrand Linthout, Venlo, Netherlands

[73] Assignee: Van Der Grinten N.V., Venlo, Netherlands

[22] Filed: June 29, 1970

[21] Appl. No.: 50,693

[30] Foreign Application Priority Data

July 7, 1969  Netherlands.................69/10410

[52] U.S. Cl..................287/20 R, 287/126, 182/228, 242/118.4
[51] Int. Cl................................................F16b 9/00
[58] Field of Search .....182/228; 29/525; 287/126, 2, 287/20 R; 285/382.4; 242/118.4, 118.61

[56] References Cited

UNITED STATES PATENTS

| | | | |
|---|---|---|---|
| 1,050,785 | 1/1913 | Austin | 242/118.4 |
| 2,567,522 | 9/1951 | Moen | 182/228 UX |
| 2,864,967 | 12/1958 | Redick et al. | 287/126 X |
| 2,881,986 | 4/1959 | Hubbard | 29/525 |

*Primary Examiner*—Andrew V. Kundrat
*Attorney*—Albert C. Johnston

[57] ABSTRACT

A joint serving, for instance, for joining together frame members of a photocopying apparatus is provided by means of a tube that is substantially circular in cross-section which is force-fitted upon a pin protruding from a structural member such as a frame plate, the pin being tapered to an end portion sufficiently small to enter an end of the tube and having radially retracted outer surface portions alternating with radially protruding conically shaped surface portions so that the tube end when forced upon the pin is elastically deformed and clamped to the contour of the protruding surface portions. Two opposite frame plates of an apparatus may be rigidly connected together by forcing such pins protruding on the frame plates into the opposite ends of a girder tube extending between the plates.

8 Claims, 3 Drawing Figures

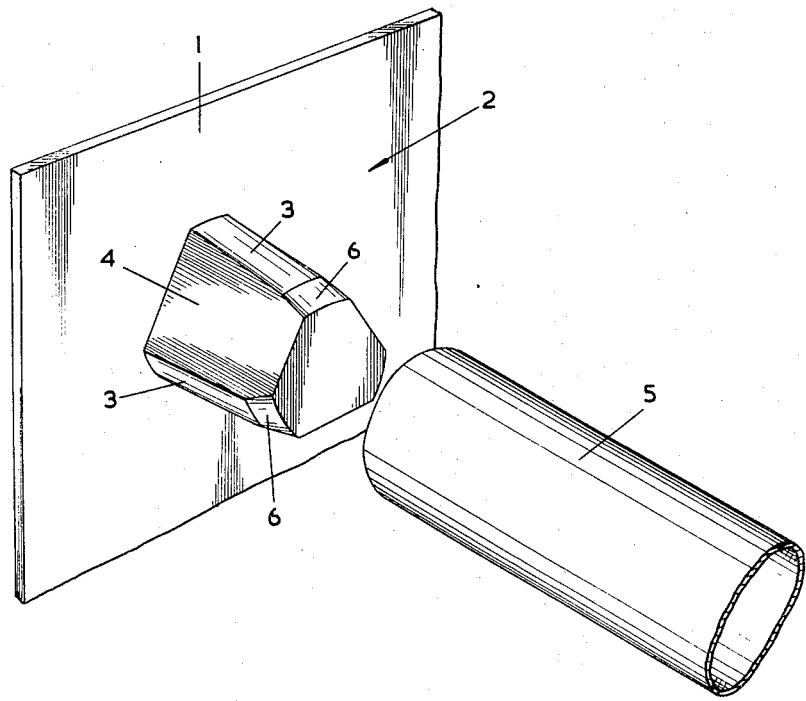
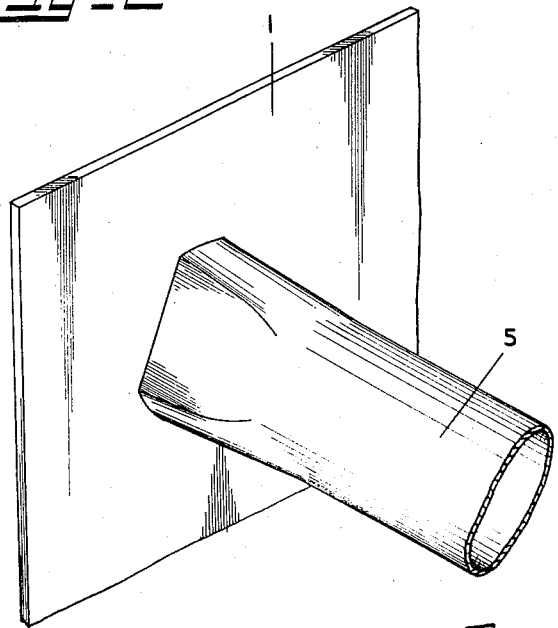

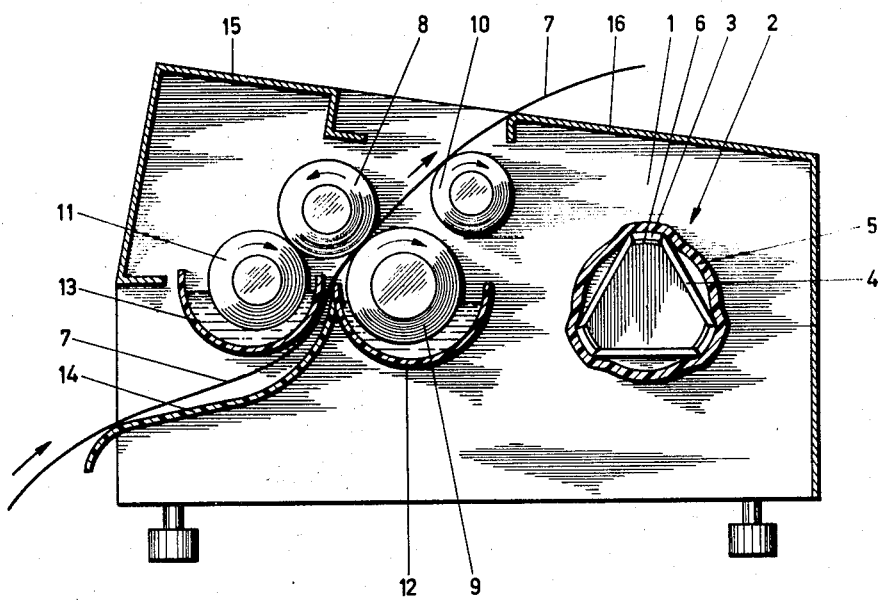

FORCE-FITTED PIN- AND TUBE JOINT AND A FRAME FOR AN APPARATUS PROVIDED WITH SUCH A JOINT

The present invention relates to the construction of a frame for an apparatus, by joining two frame plates with at least one connecting tube the ends of which are slid by force on protruding parts of the frame plates. Such frames may be provided for many different kinds of apparatus, e. g. for photocopying apparatus and for developing apparatus. The invention also relates to a force-fitted pin and tube joint.

Frames made by the use of pin and tube joints are known. For example, a known construction comprises a hollow boxgirder or connecting tube having an angular cross-section, the ends of which engage around the protruding parts of frame plates. The protruding parts have almost the same angular cross-section as the boxgirder. The frame plates are held against the ends of the boxgirder by means of a tie rod which extends through the girder.

In this known manner, an effective rigid connection between the frame plates can generally be effected. However, a practical disadvantage is encountered in that hollow boxgirders having an angular cross-section are often not entirely straight but tend to be slightly twisted along the longitudinal axis. If such a boxgirder is used for the construction of the frame, the frame plates may be slightly distorted with respect to each other; and if this is the case, the frame obtained is not serviceable.

The influence of torsion in the boxgirder can be eliminated by using a boxgirder having a circular cross-section instead of one having an angular cross-section and providing on the frame plates protruding parts having a circular cross-section. Then the frame plates will face each other correctly after joining notwithstanding any torsion in the boxgirder. However, if the frame obtained in this manner is subsequently subjected torsional loads, which is the case, for example, if the frame is moved and unequally loaded in installing it, the torque thus exerted upon the connection between the frame plate and boxgirder is likely to cause one or both of the frame plates to turn relative to the boxgirder over a short distance, the protruding part or parts thereof then sliding rotatively in the boxgirder, so that the frame is thus deformed.

It is an object of this invention to provide a simple joint means that can utilize effectively normal boxgirders or connecting tubes of circular cross-section, and by which a very rigid and permanent connection can be produced between a connecting tube and structural members such as frame plates at the ends of the tube.

This object is attained by providing on each frame plate or other structural member to be joined to the tube at least one protruding part, or pin, each of which is formed circumferentially with several outer surface portions which are considerably retracted radially inwardly with respect to the inner circumference of the tube and with several intermediate surface portions, disposed between the retracted portions, which in planes transverse to the center line of the pin define a circumscribed circle having a diameter that, in proximity to the structural member such as a frame plate, is larger than the inner diameter of the tube and that gradually decreases towards the free extremity of the pin and at its free end face is not larger than the inner diameter of the tube, so that when the extremity of the tube is forced onto this protruding part, or pin, it is deformed inwardly in the regions of the retracted surface portions and deformed outwardly in the regions of the intermediate surface portions.

In this way a connection is achieved which prevents shifting movement between the tube and the protruding pin, by virtue of the angular shape imparted to the part of the tube that is force-fitted onto the pin; and torsional loads on the frame thus obtained can be elastically absorbed by the connecting tube.

Because of the gradually decreasing diameter of the protruding pins the desired deformation of the tube ends can be obtained by simply moving frame plates towards each other with the tube positioned between them on the free ends of pins protruding from them. While the tube ends are being so pushed onto the protruding pins, the original circular shape of the tube ends is gradually transformed by deformation of them into the angular shape of the pins.

The forces required for this deformation can be applied in known manner, for example by means of screw spindles and nuts. It is also possible to move the frame plates toward each other by means of pneumatic or hydraulic jacks, and to lock the frame plates and tube to each other by screws, tie rods, etc. after they have been brought into the right position.

In preferred embodiments of the invention the generating lines of the intermediate surface portions of the protruding pin, i.e., the surface lines thereof in planes containing the center line of the pin, lie at an angle of less than 4° to this center line (the axis of the tube). This results in a desirable self-braking clamping effect. In order to avoid making the protruding pin with undesirable length, it is advantageous to provide the intermediate surface portions with steeper bevels, or entry surfaces, adjacent to the free end face of the pin. An angle of 10° to 12° may be provided satisfactorily between the generating lines of these bevels and the center line of the pin.

According to a very effective embodiment of the invention, one or more thin-walled steel connecting tubes are used and the protruding pins of the frame plates are formed so that the base region of each pin adjacent to the frame plate will deform the tube end forced thereonto to an enlarged inner perimeter which is 4–5 percent larger than the inner circumference (perimeter) of the tube in the adjacent part thereof not deformed by the pin. This enlarged perimeter of the tube may be the same as the perimeter of the pin in the same region, but the latter perimeter may be greater if the retracted surface portions are retracted radially inwardly so far that the tube will not conform to them when being deformed by the protruding pin penetrating thereinto. In this way, during the joining with the frame plates the tube is not only deformed but also elastically elongated in radial directions so that the tube ends clamp better around the protruding pins and a non-releasing connection between the tube and the frame plates is obtained, which needs not be locked in any other way.

The invention will now be explained more fully with reference to a preferred embodiment shown in the accompanying drawings in which:

FIG. 1 is a perspective view of the protruding part, or pin, provided on a frame plate according to the invention and of an end portion of a tube, before being joined together;

FIG. 2 is a perspective view of the protruding pin and the tube after joining; and FIG. 3 is a somewhat diagrammatic transverse vertical section through an apparatus for developing photocopies, the frame plates of which are joined together according to the invention.

In these figures, a frame plate 1 is provided with a protruding pin 2 which, in a way not shown, is connected rigidly at its base to the frame plate, for instance by the plate and the protruding pin constituting one casting. The periphery of the pin 2 is constituted by a plurality of narrower surface portions 3 which are separated from each other by wider retracted surface portions 4.

The narrower surface portions together define a cone-shaped surface. In the proximity of the plate 1 a circle circumscribed on them is larger than the inner circumference of a tube 5 which has a circular cross-section enabling it to be slid by force onto the protruding pin. The angles between the generating lines of these narrower surface portions and the center line of the pin are smaller than 3°, so that the circle circumscribed on these portions of the pin gradually decreases in radius in the direction towards the free end of the pin. By providing the narrower surface portions 3 at their ends with more steeply inclined entry surfaces or bevels 6, which constitute segments of a cone-shaped surface having a large angle of convergence with the surface portions 3, the free end of the pin is made so that the circle circumscribed on it is smaller than the inner circumference of tube 5.

The wider surface portions 4 lie in planes which extend between the edges of adjacent curved surface portions and are indented (retracted) radially inwardly to a considerable extent relative to the latter and the inner circumference of the tube. Moreover, the protruding pin 2 has such dimensions that its perimeter in the proximity of the frame plate is 4–5 percent larger than the inner circumference (perimeter) of tube 5.

For joining two frame plates similar to plate 1 by a tube 5 extending between them, the tube ends are placed on the ends of pins corresponding to part 2 on the two plates, and then the frame plates are moved forcibly towards each other, for instance with the aid of hydraulic jacks which engage the outer sides of the frame plates. The force required for this movement is of course dependent on the dimensions of tube 5 and on the strength of the material of which tube 5 is composed. When use is made of a single weldless steel tube having a wall thickness of 1.5 mm and a diameter of 50 mm and the protruding pin has a length of about 60 mm, the force required amounts to about 6000 kg.

Under these conditions, while the protruding pins are being pushed into the tube, the ends of the tube gradually lose their circular shape and assume a shape corresponding to the shape of the protruding pin (see FIG. 2). At the same time the ends of the tube are elastically elongated so that they clamp tightly around the protruding pins and thus provide non-releasing connections between the frame plates and the tube.

In FIG. 3 the tube 5 is shown in cross-section, looking towards one frame plate 1 of an apparatus for developing photo copies. One of the protruding pins 2 is clearly visible in end elevation. The tube connects this frame plate 1 to a similar frame plate at the other side of the apparatus. A sheet 7 of copy paper is shown being moved through the apparatus in the direction of the arrows shown along this sheet.

Rollers 8 and 9 are driven by an electric motor, not shown, in the direction of the arrows shown therein, in order to convey the sheet 7. A guide roller 10 guides the sheet 7 to have it leave the apparatus correctly. A roller 11 is driven either by frictional contact with roller 8 or by a driving gear on its shaft deriving power from the same electric motor. Below rollers 9 and 11 there are troughs 12 and 13, respectively, filled with a developing liquid into which the rollers 9 and 11 are partially submerged.

A guide plate 14 guides the incoming sheets of copy material to be developed into a slot between troughs 12 and 13 and so into the nib between rollers 8 and 9. Roller 8 is fed with developing liquid by contact with roller 11. Rollers 8 and 9 thus wet the sheet 7 with developing liquid.

The electric motor, driving gears, switches, etc. may be provided to one side of one of the frame plates 1, so outside the space between said frame plates. Cover plates 15 and 16 enclose the moving parts of the apparatus.

It will be clear that the tube 5 force-fitted upon a pin 2 at each end thereof acts as a backbone for the apparatus, so as to keep the entire structure joined rigidly together. Of course there may also be additional parts to connect the frame plates. For example, the cover plates 15 and 16 may be connected to the frame plates 1 to give additional rigidity. The several rollers may be rotatably supported in bearings in the frame plates and the troughs and other stationary parts may be mounted rigidly on said frame plates.

What is claimed is:

1. A joint comprising a rigid pin protruding from a supporting member and a substantially rigid tube of hard resilient material having an end portion thereof initially of substantially circular cross-section force-fitted axially onto said pin, the periphery of said pin comprising a plurality of surface portions spaced apart circumferentially and retracted radially inwardly to a distance from the center line of said pin substantially smaller than the initial inside radius of said end portion and a plurality of circumferentially convex surface portions respectively lying between said retracted surface portions and tapering in axial direction from a radius adjacent to the base of said pin substantially greater than said initial inside radius to a radius at the free end of said pin not greater than said initial inside radius, said convex surface portions having adjacent to the free end of said pin beveled portions tapering at an increased inclination relative to said center line to a radius thereof at said free end smaller than said initial inside radius, said force-fitted end portion being deformed elastically outwardly in regions thereof upon said convex surface portions and inwardly in regions thereof over said retracted surface portions and thereby being clamped immovably upon said pin.

2. A joint according to claim 1, said retracted surface portions being substantially flat and said convex surface portions constituting circumferentially spaced segments of a common frustum of a cone.

3. A joint according to claim 1, the generating lines of said convex surface portions being inclined at an angle of less than 4° relative to said center line.

4. A joint according to claim 1, the generating lines of said convex surface portions extending to said beveled portions at an angle of less than 4° relative to said center line and being inclined at an angle of about 10°–12 relative thereto in said beveled portions.

5. A joint according to claim 1, the perimeter of said pin adjacent to the base thereof being approximately 4 to 5 percent greater than the initial inner circumference of said end portion.

6. A supporting frame for apparatus, comprising oppositely disposed frame plates joined together by a substantially rigid connecting tube extending between the plates, wherein each said plate is fixed to said tube by a joint according to claim 1 the rigid pin of which protrudes from the frame plate and the tube of which is said connecting tube.

7. A joint comprising a rigid pin protruding from a supporting member and a cylindrical seamless steel tube having an end portion thereof force-fitted axially onto said pin, the periphery of said pin comprising three substantially flat surface portions spaced apart about the center line of said pin and retracted radially inwardly to a distance from said center line substantially smaller than the inside radius of said tube and three narrower, circumferentially convex surface portions respectively lying between said flat surface portions and constituting segments of a common fructum of a cone, the perimeter of said pin adjacent to the base thereof being approximately 4 to 5 percent greater than the inner circumference of said tube, said convex surface portions having adjacent to the free end of said pin beveled portions the generating lines of which taper at an angle of about 10° – 12° relative to said center line to a radius thereof at said free end smaller than said inside radius, the generating lines of said convex surface portions extending to said beveled portions at an angle of less than 4° relative to said center line, said force-fitted end portion being deformed elastically outwardly in regions thereof upon said convex surface portions and inwardly in regions thereof over said flat surface portions and thereby being clamped immovably upon said pin.

8. A supporting frame for apparatus, comprising oppositely disposed frame plates joined together by a cylindrical seamless steel tube extending between the plates, wherein each said plate is fixed to said tube by a joint according to claim 7 the rigid pin of which protrudes from the frame plate and the tube of which is said steel tube.

* * * * *